United States Patent
Heller

(10) Patent No.: US 12,479,376 B2
(45) Date of Patent: Nov. 25, 2025

(54) TESTING OF AT LEAST ONE VEHICLE CONTROL UNIT

(71) Applicant: Bayerische Motoren Werke Aktiengesellschaft, Munich (DE)

(72) Inventor: Martin Heller, Graben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 186 days.

(21) Appl. No.: 18/276,072

(22) PCT Filed: Feb. 11, 2022

(86) PCT No.: PCT/EP2022/053382
§ 371 (c)(1),
(2) Date: Aug. 7, 2023

(87) PCT Pub. No.: WO2022/175180
PCT Pub. Date: Aug. 25, 2022

(65) Prior Publication Data
US 2024/0101052 A1    Mar. 28, 2024

(30) Foreign Application Priority Data
Feb. 18, 2021    (DE) ............ 10 2021 103 884.7

(51) Int. Cl.
*B60R 16/023*    (2006.01)
*H04L 12/40*    (2006.01)

(52) U.S. Cl.
CPC .......... *B60R 16/0232* (2013.01); *H04L 12/40* (2013.01); *H04L 2012/40273* (2013.01)

(58) Field of Classification Search
CPC ............... B60R 16/0232; H04L 12/40; H04L 2012/40273; G05B 23/0256
See application file for complete search history.

(56) References Cited

U.S. PATENT DOCUMENTS

2013/0114647 A1    5/2013  Koike
2014/0207994 A1*   7/2014  Cherkaoui ........... H04L 12/42
                                                710/312
(Continued)

FOREIGN PATENT DOCUMENTS

CN    101566849 A    10/2009
CN    202183045 U     4/2012
(Continued)

OTHER PUBLICATIONS

English Translation of the Written Opinion of the International Searching Authority for PCT/EP2022/053382; date of mailing Jun. 8, 2022. (Year: 2022).*

(Continued)

*Primary Examiner* — Calvin Cheung
(74) *Attorney, Agent, or Firm* — Crowell & Moring LLP

(57) ABSTRACT

A testing device for testing at least one vehicle control unit includes an error feedforward device for feeding forward predefined electrical signals to the at least one vehicle control unit. The error feedforward device has, for electrical signal connection to the at least one vehicle control unit at least one power interface configured for conducting power signals, at least one control signal interface configured for conducting control signals, and at least one data bus interface configured for conducting bus signals. At least the bus lines belonging to the at least one data bus interface are guided separately in the testing device from the electrical lines belonging to the other types of interface.

12 Claims, 1 Drawing Sheet

(56) References Cited

U.S. PATENT DOCUMENTS

2017/0249225 A1    8/2017  Guddeti et al.
2018/0254918 A1*  9/2018  Rocher ............. H04L 12/40169

FOREIGN PATENT DOCUMENTS

| CN | 205121326 U | 3/2016 |
| CN | 209543136 U | 10/2019 |
| CN | 111458591 A | 7/2020 |
| DE | 38 39 211 A1 | 5/1990 |
| DE | 10 2010 043 661 A1 | 5/2012 |
| DE | 10 2012 220 046 A1 | 5/2013 |
| DE | 10 2016 203 271 A1 | 8/2017 |
| DE | 10 2015 108 064 B4 | 8/2018 |

OTHER PUBLICATIONS

English translation of DE 102010043661 A1 copied and pasted from WIPO translate webpage into Microsoft Word on May 22, 2025. (Year: 2025).*

CN 209543136 U with English translation; date filed Apr. 15, 2019; date published Oct. 25, 2019. (Year: 2019).*

Vikas Dayal, "Ethernet Cables: A Brief History", Jul. 16, 2020. Retrieved via Wayback Machine. (Year: 2020).*

KR 20210100474 A with English translation; date filed Feb. 6, 2020; date published Aug. 17, 2021. (Year: 2021).*

International Search Report (PCT/ISA/210) issued in PCT Application No. PCT/EP2022/053382 dated Jun. 8, 2022 with English translation (4 pages).

German-language Written Opinion (PCT/ISA/237) issued in PCT Application No. PCT/EP2022/053382 dated Jun. 8, 2022 (7 pages).

German-language Search Report issued in German Application No. 10 2021 103 884.7 dated Jan. 26, 2022 with partial English translation (12 pages).

Chinese-language Office Action issued in Chinese Application No. 202280013160.2 dated Sep. 28, 2025, with English translation (17 pages).

* cited by examiner

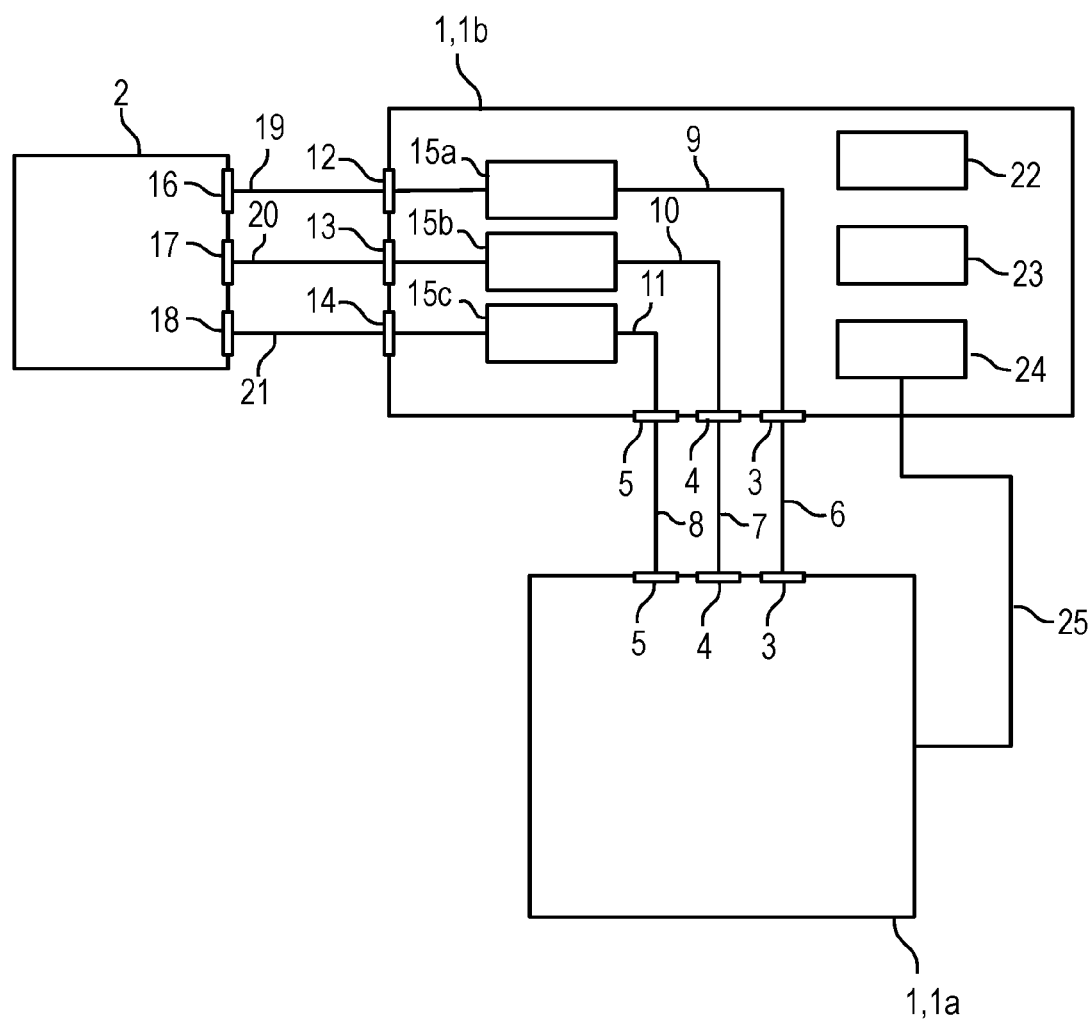

TESTING OF AT LEAST ONE VEHICLE CONTROL UNIT

BACKGROUND AND SUMMARY OF THE INVENTION

The invention relates to a testing apparatus for testing at least one vehicle control unit, wherein the testing apparatus has an error feedforward device for feeding forward predefined electrical signals to the at least one vehicle control unit, the error feedforward device having, for the purpose of electrical signal connection to the at least one vehicle control unit, at least one interface. The invention also relates to a system having the testing apparatus and a vehicle control unit connected to the error feedforward device. The invention also relates to a method for testing at least one vehicle control unit, in which an error feedforward device is used to feed forward predefined electrical signals to the at least one vehicle control unit. The invention is in particular advantageously able to be used for testing one or more gearbox-control control units.

DE 10 2015 108 064 B4 discloses a testing system for the automated testing of at least two control units connected to the test system at the same time, having: a control computer, storing environment model data for the control units to be tested and, for a test sequence containing multiple test steps, control unit control data and reference data for control unit output signals; an environment simulation computer, connected to the control computer, and an input/output interface for outputting environment model test signals and/or control test signals and for receiving control unit output signals; wherein the environment simulation computer is designed such that a test sequence containing multiple test steps is able to be carried out by virtue of the environment simulation computer using the environment model data and control unit control data received from the control computer to generate environment model test signals and/or control test signals and outputting them via its input/output interface; and by virtue of the environment simulation computer comparing control unit output signals received via its input/output interface with reference data for control unit output signals; wherein there is provision for a separate control-unit-connection and control-unit changeover unit that has a test signal interface, a changeover interface, at least two control unit connection interfaces and at least one switch; the test signal interface is connected to the input/output interface of the environment simulation computer; the changeover interface is connected to the control computer; and the control computer and the at least one switch of the control-unit-connection and control-unit changeover unit are designed such that after a test sequence containing multiple test steps has been performed for a connected control unit, the control computer outputs a changeover signal to the control-unit-connection and control-unit changeover unit and changes over at least one switch such that the test signal interface is connected to the control unit connection interface of a second connected control unit.

The object of the present invention is to overcome at least some of the disadvantages of the prior art and in particular to provide an improved way of feeding forward signals to a vehicle control unit.

This object is achieved according to the features of the claimed invention.

The object is achieved by a testing apparatus for testing, in particular in an automated manner, at least one vehicle control unit connected to the testing apparatus via at least one interface, wherein the testing apparatus has an error feedforward device for feeding forward predefined electrical signals to the at least one vehicle control unit, the error feedforward device having, for the purpose of electrical signal connection to the at least one vehicle control unit, at least:
- at least one power interface configured to transfer power signals,
- at least one control signal interface configured to transfer control signals, and
- at least one data bus interface configured to transfer bus signals,
- and wherein at least the bus lines associated with the at least one data bus interface are routed in the testing apparatus separately from the electrical lines associated with other types of interface.

This achieves the advantage that the signals applied to the vehicle control unit are routed via dedicated interfaces and cables that are dedicatedly geared to the type of signals routed through. This makes it possible to avoid interference effects caused by a transmission of signals to the vehicle control unit as a result of an absence of hardware matching for the type of transmitted signals. This is particularly advantageous for bus signals transmitted via a data bus interface that react sensitively to the design of their signal path in particular at high transmission rates.

By contrast, for example DE 10 2015 108 064 B4 merely describes Sub-D connections that can be used to transmit electrical signals to the vehicle control unit. Although it is fundamentally also possible to transmit fast bus signals via Sub-D connections, the interference effects mentioned above can arise.

The error feedforward device is provided in order to feed forward predefined electrical signals to the at least one vehicle control unit. To this end, it can have for example one or more switches or switch units such as e.g. electrical or electronic switches, switch points, etc., which deliver or feed forward power, control and bus signals generated outside and/or in the testing apparatus to the appropriate interfaces via the associated cables. The signals may be chosen in particular such that they simulate error or misuse cases. The testing apparatus can then record and examine the reaction of the vehicle control unit and/or of an actuator connected thereto to the predefined electrical signals. To this end, the testing apparatus is advantageously configured to at least use at least one interface to receive electrical signals from the vehicle control unit and/or an actuator connected thereto. As a result, e.g. errors in vehicle control units can be detected, suggestions for improving vehicle control units made, etc. The testing apparatus can be developed analogously to DE 10 2015 108 064 B4.

The error feedforward device may be configured, on the basis of the switches or switch units, in particular to test one or more vehicle control units at the same time and/or in succession.

The power signals, control signals and bus signals can collectively also be referred to as "test signals".

The electrical power signals are in particular signals that are used to supply the vehicle control unit with electrical operating energy, e.g. an operating voltage. The electrical power signals can correspond to DC or AC voltages. The electrical power signals are in particular in a voltage range above the extra-low-voltage range, for example are at an AC voltage above 50 V or at a DC voltage above 120 V. However, they may also be lower (for example in a voltage range between 5 V and 48 V) or higher (for example 400 V or 800 V). The electrical power signals can be in particular at a voltage corresponding to a vehicle electrical system or electrical system section, e.g. at 24 V, 48 V, 400 V, 800 V, etc. In particular the power signal lines and interfaces are specifically configured to conduct the electric currents impressed for supplying power.

The electrical control signals are used in particular for controlling the vehicle control unit. The electrical control signals may be in particular analog and/or digital signals in the extra-low-voltage range, for example pulse-width-modulated signals at a frequency in a range between 30 kHz and 2 MHz. The electrical control signals are in particular in a voltage range between 5 V and 48 V, but are not limited thereto.

The bus signals are electrical signals transmitted via a data bus formed by the bus lines. The bus signals are bus-compliant, i.e. comply with a specification that applies to a respective data bus, e.g. in regard to form, format, timing, clocking, etc. The control signals are not considered to be bus signals, and vice versa, but rather may be e.g. simple switch-on and switch-off signals, etc. The bus signals may be bus-compliant with for example CAN (in particular CAN-FD) FlexRay, Ethernet (in particular Fast Ethernet), etc., buses. In particular, the bus signals are routed only via connections or interfaces that comply with the cable routings, spacings, shieldings, pin geometries, etc. required for bus-compliant signal transmission.

Accordingly, the interfaces and associated electrical lines are matched to the type of signals to be output thereto. As such, bus signals are conducted or output e.g. via dedicated electrical (bus) lines and bus interfaces, etc. The circumstance that electrical lines are "associated with" a specific interface encompasses these electrical lines being connected to this interface and thus conducting electrical signals to and/or from this interface.

The circumstance that at least the electrical lines associated with the at least one data bus interface are routed in the testing apparatus separately from the electrical lines associated with other types of interface can encompass in particular there being no provision in the testing apparatus for electrical lines for conducting bus signals that are also used to conduct other types of signal (i.e. power signals and/or control signals). This achieves the advantage that the bus lines can be designed specifically for this purpose without interference effects (e.g. impedance mismatches, etc.) arising as a result of design compromises to allow the other types of signal to be transferred. This also allows the data bus interfaces to be matched specifically only for transferring the bus signals.

One development is that the electrical lines associated with power interfaces and/or control signal interfaces are also routed separately from one another in the testing apparatus. This advantageously allows complete signal decoupling of bus signals, power signals and control signals to be achieved.

One development is thus that the power, control and bus signals are (strictly) separated by routing these signals only via cables and interfaces whose physical properties are matched thereto.

One configuration is that the at least one data bus interface is in the form of a Fast Ethernet interface having a transmission rate of at least 10 Mbit/s, in particular of at least 100 Mbit/s. One development is that the at least one data bus interface has multiple such Fast Ethernet interfaces. The bus lines connected thereto are then Fast-Ethernet-compliant bus lines.

One configuration is that at least one data bus interface comprises at least one CAN interface, in particular CAN-FD interface, and/or at least one FlexRay interface. The testing apparatus can have or comprise in particular at least one Fast Ethernet interface, at least one CAN interface, in particular CAN-FD interface, and/or at least one FlexRay interface. One development is that the bus lines associated with a Fast Ethernet interface take separate courses from the bus lines associated with other types of data bus interface (e.g. FlexRay and/or CAN bus) in the testing apparatus.

One configuration is that the testing apparatus furthermore has at least one interface for connection to at least one actuator controlled by the vehicle control unit, and the electrical lines associated with this interface are routed in the testing apparatus separately from electrical lines associated with other types of interface. This allows these electrical lines to be configured to avoid interference effects as a result of cable compromises, similarly to the electrical lines for signal transmission with the vehicle control unit.

One configuration is that the signal feedforward device is a unit that is separate from the rest of the testing apparatus (subsequently also referred to as the "simulation unit" without restricting the generality). This results in the advantage that it can be arranged on the control unit particularly easily and can also be replaced independently.

One development is that the signal feedforward device is configured to receive test signals generated by the simulation unit and to use available switches or switch units to feed forward the test signals to the at least one vehicle control unit in a suitable manner via the appropriate interfaces. The simulation unit can then have a control computer and an environment simulation computer, e.g. similarly to DE 10 2015 108 064 B4, and be connected to the signal feedforward device via at least one power interface, at least one control signal interface and at least one data bus interface. Within the signal feedforward device, the test signals take separate courses according to type, i.e. bus signals via dedicated bus lines, control signals via dedicated control signal lines and power signals via dedicated power signal lines.

One configuration is that the error feedforward device has at least one signal generator for generating a specific type of electrical signal (e.g. bus signals, control signals, etc.) and the error feedforward device is configured to conduct these electrical signals in the error feedforward device separately from cables for conducting other types of electrical signal to at least one interface provided for connection to the at least one vehicle control unit. The error feedforward device can be connected to the simulation unit via at least one control line for the purpose of controlling the at least one signal generator and can use this control line to output e.g. appropriate commands for operating/controlling the at least one signal generator. The error feedforward device can in particular have a control device such as a controller or the like for this purpose. This configuration is particularly advantageous if the error feedforward device and the simulation unit are not arranged directly beside one another, but rather e.g. are arranged in separate rooms, buildings or even locations.

Alternatively, the signal feedforward device can be integrated in the design of the testing apparatus together with the simulation unit. This facilitates a particularly compact and simple design and also particularly simple handling of the testing apparatus. In this case too, at least the bus signals are (strictly) separated from the power and control signals within the testing apparatus by routing the bus signals only via bus lines and bus interfaces whose physical properties are matched thereto. In the integrated arrangement too, it is advantageous if the power and control signals are additionally routed separately. It is also advantageous in the integrated arrangement if the different types of bus signal (e.g. Ethernet, CAN and/or FlexRay) are separated.

The object is also achieved by a system having the testing apparatus as described above and a vehicle control unit connected to the error feedforward device. The system can be designed analogously to the testing apparatus and yields the same advantages.

One configuration is that the at least one vehicle control unit is at least one gearbox-control control unit.

The object is furthermore achieved by a method for testing at least one vehicle control unit, in which an error feedforward device is used to feed forward predefined electrical signals to the at least one vehicle control unit, wherein power signals are transmitted from the error feedforward device to the vehicle control unit via at least one power interface, control signals are transmitted from the error feedforward device to the vehicle control unit via at least one control signal interface, and bus signals are transmitted from the error feedforward device to the vehicle control unit via at least one data bus interface, wherein at least the bus signals are routed in the error feedforward device separately from the power signals and control signals.

One configuration is that at least some of the power signals, control signals and/or bus signals are generated in the error feedforward device, and otherwise can be received e.g. from a simulation device.

The properties, features and advantages of this invention that are described above and the way in which they are achieved will become clearer and more distinctly comprehensible in conjunction with the schematic description that follows for an exemplary embodiment, which is explained in more detail in conjunction with the drawing.

BRIEF DESCRIPTION OF THE DRAWING

FIG. 1 shows a functional diagram of an exemplary embodiment of a system including a testing apparatus and at least one vehicle control unit.

DETAILED DESCRIPTION OF THE DRAWING

FIG. 1 shows a functional diagram of an exemplary embodiment of a system comprising a testing apparatus 1 and at least one vehicle control unit 2 in the form of e.g. a gearbox-control control unit. The testing apparatus 1 here comprises two physically separate units, specifically a simulation unit 1a and an error feedforward device 1b.

The simulation unit 1a and the error feedforward device 1b each have at least one power interface 3, at least one control signal interface 4 and at least one data bus interface in the form of a Fast Ethernet interface 5, interfaces of the same type (power/control signal/data bus) being connected to one another via at least one respective associated power signal cable 6, control signal cable 7 or bus cable 8.

The at least one power interface 3, at least one control signal interface 4 and at least one Fast Ethernet interface 5 are directed in the error feedforward device 1b to the same type of interface (i.e. to at least one power interface 12, at least one control signal interface 13 or at least one Fast Ethernet interface 14) via respective electrical lines (i.e. power signal lines 9 for transferring power signals, control signal lines 10 for transferring control signals and Fast Ethernet lines 11 for transferring Ethernet bus signals), which take separate courses according to type, for the purpose of feeding forward test signals to the at least one vehicle control unit 1.

The power signal lines 9, control signal lines 10 and Fast Ethernet lines 11 can have one or more interposed switches or switch units 15a, 15b and 15c, such as e.g. electrical or electronic switches, switch points, etc., that can be used to simultaneously feed forward or distribute the test signals arriving via the interfaces 3 to 5 to a vehicle control unit 2 or multiple vehicle control units 2 (not shown) by way of the interfaces 12 to 14. The switches 15a, 15b, 15c can alternatively or additionally be used to interrupt the associated transmission line (power, bus or control signals) in a controlled manner.

In principle, it may also be necessary to supply regular signals/data and to ensure laboratory operation for a component.

In the case of a non-rotating shaft that is present secondarily in the laboratory, a speed signal would be able to be supplied or a torque, speed or angular position would be able to be applied to a simulator (external actuating drive) during partial virtualization for simulation purposes.

The vehicle control unit 2 here has at least one applicable power interface 16, at least one control signal interface 17 and at least one Fast Ethernet interface 18, which are connected to the interfaces 12 to 14 separately via appropriate cables 19, 20 and 21, respectively.

As an alternative or in addition to the Fast Ethernet interfaces 5 and 14, the simulation unit 1a and the error feedforward device 1b can have data bus interfaces in the form of CAN interfaces, in particular CAN-FD interfaces, and/or FlexRay interfaces (not shown). In particular, data lines associated with interfaces of a different bus type (e.g. Fast Ethernet/CAN/FlexRay) can take separate courses.

The testing apparatus 1 can furthermore have at least one interface for connection to at least one actuator controlled by the control unit (not shown).

The error feedforward device 1b can optionally have at least one signal generator 22 for generating a specific type of electrical signal (e.g. bus signals, power signals and/or control signals). This achieves the advantage that such signals can be generated in addition or as an alternative to an applicable type of signal transmitted by the simulation unit 1a. This can be used for example in order to simplify simulation environments or simulation constraints, in particular to make it easier to feed forward the signals to different test subjects (control unit(s), actuators controlled thereby, sensors connected thereto, etc.) and/or to reconstruct the behavior of such test subjects. The electrical signals generated by the at least one signal generator 22 are also routed in the error feedforward device 1b separately according to type, e.g. Fast Ethernet signals generated by a signal generator 22 to the Fast Ethernet interface 14 via appropriate bus lines (not shown), etc. The signals generated by the at least one signal generator 22 can be routed in the error feedforward device 1b separately from the signals generated by the simulation unit 1a or received on the interfaces 3, 4 and/or 5, specifically to the same interfaces 12 to 14 and/or to separate interfaces. One development is that signals generated by the at least one signal generator 22 are routed in at least sections of the error feedforward device 1b on the same lines as the signals generated by the simulation unit 1a or received on the interfaces 3, 4 and/or 5 if the signals are of the same type.

The error feedforward device 1b can optionally have at least one reference voltage source 23. This can be used for example to produce reference voltages that can be delivered to test subjects connected to the error feedforward device 1b, for example operating voltages/vehicle electrical system voltages, etc. one development is that at least one reference voltage source 23 is used to generate power signals.

The error feedforward device 1b can also have a control device 24, such as a controller, etc., that is configured e.g. to switch the switches or switch units 15a, 15b and 15c and to control the signal generator 22 and the reference voltage source 23.

The simulation unit 1a can be connected to the control device 24 via a control line 25, which is used to output commands or instructions to the control device 24. The control device 24 can use these commands or instructions to control the switches or switch units 15a, 15b and 15c and to control the signal generator 22 and the reference voltage source 23.

The testing apparatus 1 can be used for example to perform misuse tests, short circuits, limit tests (for example for undervoltages and/or overvoltages), phase shifts, ground shifts, signal manipulations, maximum and minimum value tests, etc.

It goes without saying that the present invention is not limited to the exemplary embodiment shown.

Generally, "a(n)", "one", etc., can be understood to mean a singular or a plural, in particular in the sense of "at least one" or "one or more", etc., as long as this is not explicitly excluded, e.g. by the expression "exactly one", etc.

Moreover, a numerical indication can encompass exactly the indicated number and also a customary tolerance range, as long as this is not explicitly excluded.

LIST OF REFERENCE SIGNS

1 testing apparatus
1a simulation unit
1b error feedforward device
2 vehicle control unit
3 power interface
4 control signal interface
5 Fast Ethernet interface
6 power signal cable
7 control signal cable
8 bus cable
9 power signal line
10 control signal line
11 Fast Ethernet line
12 power interface
13 control signal interface
14 Fast Ethernet interface
15a-15c switch or switch units
16 power interface
17 control signal interface
18 Fast Ethernet interface
19 cable
20 cable
21 cable
22 signal generator
23 reference voltage source
24 control device
25 control line

The invention claimed is:

1. A testing apparatus for testing at least one vehicle control unit, the testing apparatus comprising:
an error feedforward device for feeding forward predefined electrical signals to the at least one vehicle control unit, wherein:
the error feedforward device comprises, for electrical signal connection to the at least one vehicle control unit:
at least one power interface configured to transfer power signals,
at least one control signal interface configured to transfer control signals, and
at least one data bus interface configured to transfer bus signals, and
at least bus lines associated with the at least one data bus interface are routed in the testing apparatus separately from all electrical lines associated with other types of interface.

2. The testing apparatus according to claim 1, wherein the at least one data bus interface is in a form of a Fast Ethernet interface having a transmission rate of at least 10 Mbit/s.

3. The testing apparatus according to claim 1, wherein the at least one data bus interface is in a form of a Fast Ethernet interface having a transmission rate of at least 100 Mbit/s.

4. The testing apparatus according to claim 1, wherein the at least one data bus interface is in a form of at least one of a CAN interface or at least one FlexRay interface.

5. The testing apparatus according to claim 1, wherein the at least one data bus interface is in a form of at least one of a CAN-FD interface or at least one FlexRay interface.

6. The testing apparatus according to claim 1, wherein the testing apparatus has at least one interface for connection to at least one actuator controlled by the control unit, and electrical lines associated with the at least one interface are routed in the testing apparatus separately from electrical lines associated with other types of interface.

7. The testing apparatus according to claim 1, wherein the error feedforward device is a separate unit.

8. The testing apparatus according to claim 7, wherein the error feedforward device has at least one signal generator for generating a specific type of electrical signal and the error feedforward device is configured to conduct electrical signals of the specific type in the error feedforward device separately from electrical lines for conducting other types of electrical signal to at least one interface provided for connection to the at least one vehicle control unit in order to output the specific type of electrical signal.

9. A system comprising:
a testing apparatus for testing at least one vehicle control unit, the testing apparatus comprising:
an error feedforward device for feeding forward predefined electrical signals to the at least one vehicle control unit; and
at least one vehicle control unit connected to the error feedforward device, wherein:
the error feedforward device comprises, for electrical signal connection to the at least one vehicle control unit:
at least one power interface configured to transfer power signals,
at least one control signal interface configured to transfer control signals, and
at least one data bus interface configured to transfer bus signals, and
at least bus lines associated with the at least one data bus interface are routed in the testing apparatus separately from all electrical lines associated with other types of interface.

10. The system according to claim 9, wherein the at least one vehicle control unit is at least one gearbox-control control unit.

11. A method for testing at least one vehicle control unit, wherein an error feedforward device is used to feed forward predefined electrical signals to the at least one vehicle control unit, the method comprising:

transmitting power signals from the error feedforward device to the at least one vehicle control unit via at least one power interface, transmitting control signals from the error feedforward device to the at least one vehicle control unit via at least one control signal interface, and transmitting bus signals from the error feedforward device to the vehicle control unit via at least one data bus interface, wherein at least the bus signals are routed in the error feedforward device separately from all of the power signals and all of the control signals.

12. The method according to claim 11, wherein at least some of the power signals, control signals or bus signals are generated in the error feedforward device.

* * * * *